United States Patent
Scheidhauer et al.

(10) Patent No.: US 7,791,620 B2
(45) Date of Patent: Sep. 7, 2010

(54) SYSTEMS AND METHODS FOR RENDERING SYMBOLS USING NON-LINEAR SCALING

(75) Inventors: Ralf Scheidhauer, Hamburg (DE); Frank Toennies, Saarbruecken (DE)

(73) Assignee: IDS Scheer Aktiengesellschaft, Saarbruecken (DE)

( * ) Notice: Subject to any disclaimer, the term of this patent is extended or adjusted under 35 U.S.C. 154(b) by 1033 days.

(21) Appl. No.: 11/448,097

(22) Filed: Jun. 7, 2006

(65) Prior Publication Data
US 2006/0291749 A1 Dec. 28, 2006

Related U.S. Application Data

(60) Provisional application No. 60/687,853, filed on Jun. 7, 2005.

(51) Int. Cl.
- G09G 5/00 (2006.01)
- G06K 9/32 (2006.01)
- G06F 3/048 (2006.01)

(52) U.S. Cl. .................. 345/660; 345/661; 345/665; 345/667; 382/298; 715/800

(58) Field of Classification Search ......... 345/660–671; 382/298; 715/800
See application file for complete search history.

(56) References Cited

U.S. PATENT DOCUMENTS

2005/0108656 A1* 5/2005 Wu et al. ................. 715/801

OTHER PUBLICATIONS

Kim Marriot et al, "Fast and Efficient Client-Side Adaptivity for SVG", WWW, May 7-11, 2002 Honolulu, Hawaii, USA, ACM, pp. 496-507.*

Scalable Vector Graphics (SVG) 1.1 Specification W3C Recommendation Jan. 14, 2003, 9 Basic Shapes, http://www.w3.org/TR/SVG/shapes.html.*

A vector drawing program for Unix, Sketch Tutor, http://web.archive.org/web/20040720091218/http://www.linuxgraphic.org/section2d/sketch/docsketch_eng/docsketch.pdf).*

Badros et al, "A Constraint Extension to Scalable Vector Graphics", WWW 10, May 1-5, 2001, Hong Kong, ACM, pp. 489-498.*

U.S. Appl. No. 11/448,074, entitled "Systems and Methods for Creating Symbols and Rendering Models Using Such Symbols," filed Jun. 7, 2006.

U.S. Appl. No. 11/448,103, entitled "Systems and Methods for Rendering Text Within Symbols," filed Jun. 7, 2006.

* cited by examiner

*Primary Examiner*—Xiao M Wu
*Assistant Examiner*—Tize Ma
(74) *Attorney, Agent, or Firm*—Finnegan, Henderson, Farabow, Garrett & Dunner, LLP

(57) ABSTRACT

Systems and methods are provided for rendering a symbol with non-linear scaling, the symbol comprising one or more elements. In one implementation, a computer-implemented method is provided for rendering a symbol and may comprise the steps of receiving a scaling instruction to scale the symbol, the scaling instruction including at least one scaling factor, determining whether to exclude one or more elements of the symbol from the scaling factor to be applied to the symbol, wherein a determination to exclude one or more elements is based on whether an element is tagged as being non-scalable, and rendering the symbol on a canvas with non-linear scaling, such that the elements of the symbol that are determined to be tagged are not scaled according to the scaling factor.

17 Claims, 12 Drawing Sheets

SYSTEMS AND METHODS FOR RENDERING SYMBOLS USING NON-LINEAR SCALING

CROSS REFERENCE TO RELATED APPLICATION(S)

This application claims the benefit of priority from U.S. Provisional Application No. 60/687,853, entitled "Computerized Systems and Methods for Displaying Objects and File Formats Related Thereto," filed Jun. 7, 2005, the disclosure of which is expressly incorporated herein by reference to its entirety.

BACKGROUND

I. Technical Field

The present invention generally relates to the field of computer graphics and to the rendering of symbols to facilitate, for example, the modeling of processes, such as business processes. More particularly, the present invention relates to computerized systems and methods for rendering symbols using non-linear scaling.

II. Background Information

Many software and consulting companies use tools for strategy, design, implementation and controlling of business processes. A "business process" describes functions or activities that occur in a particular order and that create added value for a company. Since business processes are crucial to performance, companies often spend a significant amount of time and effort to design efficient business processes. Further, in order to efficiently design business processes, many companies use modeling tools. A "modeling tool" may include software and/or other computerized systems that can be used to plan a process. In general, modeling tools may depict, analyze, and optimize business processes. Often times a single tool can be used for modelling business processes.

Some modeling tools allow users to model a business process in a graphical form using symbols to represent a logical sequence of steps in a process. Many of these tools contain symbols that represent the objects in a model. A user can create and modify models using a toolset built into the modeling tool or provided separately. Each model contains information about which objects and which connections are visualized in that model. For each object, the model stores information about which symbol is used to visualize the object, its position on the canvas, its size, and its style.

One example of a platform for building business processes is the ARIS Platform provided by IDS Scheer AG (Saarbruecken, Germany). The ARIS Platform provides a tool portfolio for designing, implementing, and controlling business processes. Within the ARIS platform is a repository that contains a graph and the nodes within the graph are called objects. The models are graphical representation of a part of the graph. Objects are represented in the models using symbols. A user may use symbols included with ARIS or create symbols of his own using an AMF editor that is part of the ARIS system.

Many users may require the resizing of shipped default symbols or even customized symbols for various reasons. For example, a user may need to change the size of a symbol in order to place or arrange the symbol within a model of a business process comprising multiple symbols and/or other graphical representations. Further, resizing of a symbol may be required in order for text to fit into the symbol or the user desire to resize parts of a symbol without resizing other parts.

In prior solutions, if a user wanted to resize a symbol, a renderer or other application would perform a scaling coordinate transformation. This would involve multiplying each pixel's coordinate by specified scale factors in the x and y direction. This transformation, however, does not work for all symbols and may produce undesired results since often times the shape of a symbol may change or become distorted as a result of the transformation. For example, a rectangle may no longer represent a rectangle if resized and may instead turn into a square. Scaling coordinate transformations also do not work when resizing a symbol or image that contains an external element, such as another graphic, or symbols containing lines, text, and polygons. For instance, when the elements are resized, distortions may occur with the inserted graphic, text, etc.

In view of the foregoing, there is a need for improved rendering systems and methods for scaling symbols. Moreover, there is a need for improved systems and methods for scaling symbols using non-linear scaling.

SUMMARY

Systems, methods and computer-readable media consistent with embodiments of the present invention may obviate one or more of the above and/or other issues and drawbacks. Consistent with an aspect of the invention, computerized systems and methods may be provided for rendering symbols on a canvas. The symbols may be required for any purpose, including for displaying a model of a process, such as a business process. Further, in accordance with an aspect of the invention, systems and methods may be provided for rendering symbols using non-linear scaling.

In accordance with one embodiment, a method is provided for rendering a symbol with non-linear scaling, the symbol comprising one or more elements. The method may comprise the step of receiving a scaling instruction to scale the symbol, the scaling instruction including a scaling factor. The method may further comprise the steps of determining whether to exclude one or more elements of the symbol from the scaling factor to be applied to the symbol, wherein a determination to exclude one or more of the elements is based on whether an element is tagged as being non-scalable, and rendering the symbol on a canvas with non-linear scaling, such that elements of the symbol that are determined to be tagged are not scaled according to the scaling factor.

Consistent with another embodiment of the present invention, a system is provided for rendering a symbol with non-linear scaling, the symbol comprising one or more elements. The system may comprise a processor, and a memory, wherein the memory comprises instructions that are configured to cause the processor to perform a method. The method may comprise the step of receiving a scaling instruction to scale the symbol, the scaling instruction including a scaling factor. The method may further comprise the steps of determining whether to exclude one or more elements of the symbol from the scaling factor to be applied to the symbol, wherein a determination to exclude one or more of the elements is based on whether an element is tagged as being non-scalable, and rendering the symbol on a canvas with non-linear scaling, such that elements of the symbol that are determined to be tagged are not scaled according to the scaling factor.

While certain embodiments of the inventions may be described with reference to modeling business processes, such embodiments can be implemented for other purposes as well. For example, embodiments of the invention can be implemented for rendering symbols with non-linear scaling for any graphic context or display of information, including electronic presentations such as Windows PowerPoint.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
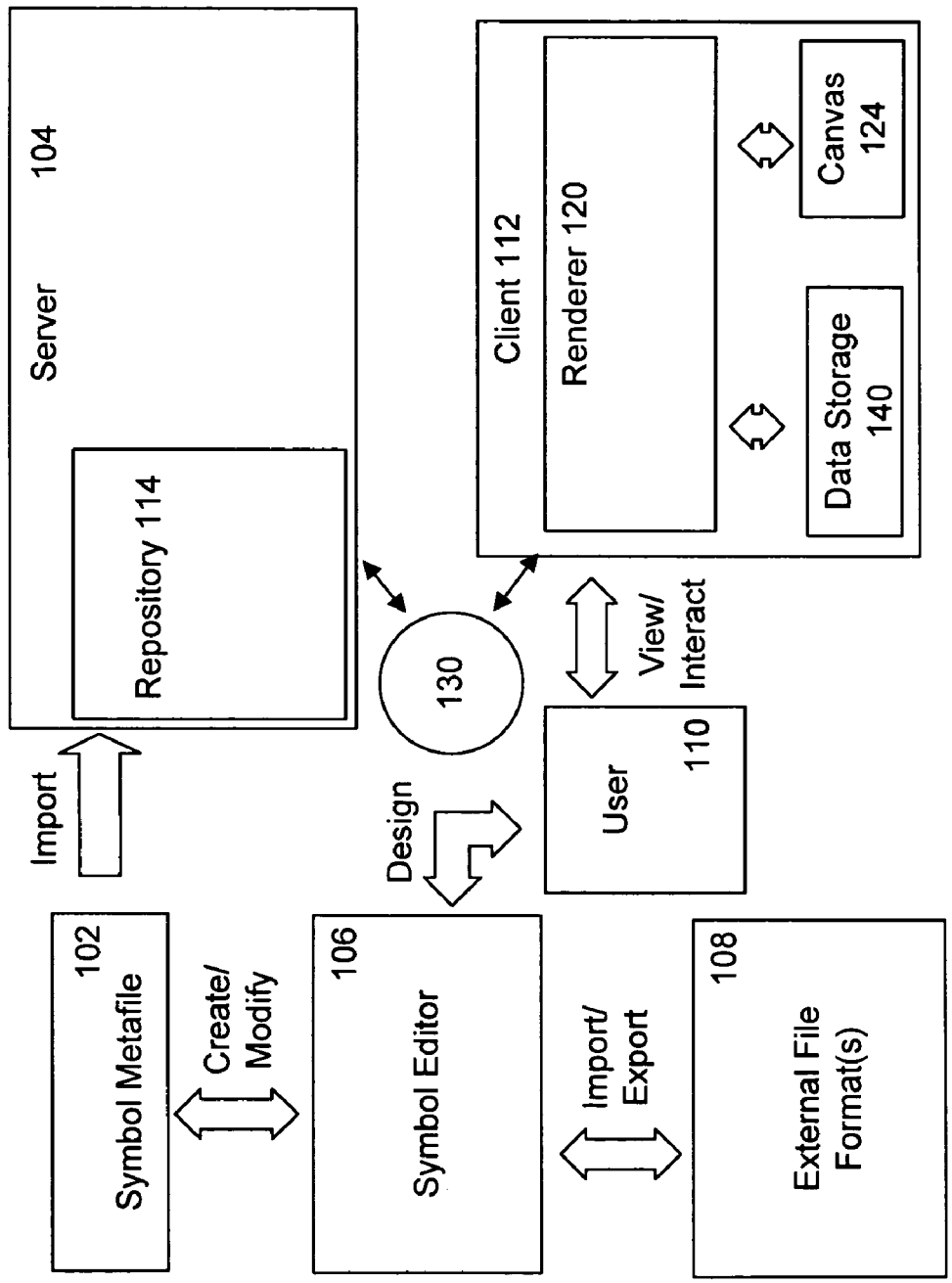
FIG. 1 illustrates an exemplary system environment, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with embodiments of the invention may be implemented to render a symbol on a canvas with non-linear scaling. As used herein, the term "canvas" refers to any medium for displaying information, including computer screens and other electronic display panels (e.g., an LCD or plasma panel). Non-linear scaling of the symbol may be achieved by defining one or more elements of the symbol as non-scalable. An element of a symbol, such as a line, corner, etc, may be defined by a user as being non-scalable by tagging it with data (e.g., extension data of a symbol metafile in standard vector graphics (SVG) format). In addition, an anchor point may be defined to control the manner in which other elements of the symbol are scaled relative to a non-scalable element.

In embodiments of the present invention, a "symbol" may depict a unique object in a graphical form. A symbol may include a text description that names or describes a function performed by an object that is modeled by the symbol. An "object" refers to a concept that can be expressed or implemented as part of a process, such as a business process. A symbol may further comprise a graphical element formed of, for example, a large rectangle with rounded corners and a small quadratic icon on the left upper corner.

Consistent with embodiments of the present invention, an editing tool (e.g., a symbol editor) may be implemented to provide a user with a workspace to create, modify and update symbols. Symbols may be stored and available for user selection from a symbol repository. The symbol repository may be accessed through a portion of a work space included in a graphical user interface. For example, the symbol repository may include symbols that have been arranged or categorized based on color groups. In one embodiment, the symbol repository comprises a standardized set of symbols provided by a software vendor, installer or other source. A user may modify one or more selected symbols from the symbol repository to create modified or new symbols with one or more non-scalable elements. Once a user has modified or created a symbol for non-linear scaling, the symbol may be saved in the symbol repository for later use (e.g., rendering in a model or other graphic representation).

FIG. 1 depicts an exemplary system environment 100, consistent with an embodiment of the present invention. Several of the components in system 100 can be implemented with, for example, the ARIS system architecture available from IDS Scheer. Further, the ARIS metafile format (AMF) may be used to define graphical symbols. As will be appreciated by one skilled in the art, however, embodiments of the invention are not limited to the ARIS environment and/or AMF, and may be applied in other environments, including computerized or software-based environment with modeling and/or graphical tools. As used herein, the term "software" encompasses any and all types of software, including computer software, computer program products, and program modules and components, including business and financial software applications and components.

As shown in FIG. 1, system 100 may include a symbol metafile 102, a server 104, a symbol editor 106, external file format(s) 108, a user 110, and a client 112. User 110 may operate client 112. Symbol metafile 102 may be for example the ARIS metafile (AMF) of the ARIS system. Editor 106 may be the AMF editor of the ARIS system. Client 112 may be the ARIS client of the ARIS system.

Symbol metafile 102 may comprise one or more XML-based files in vector graphic format. Symbol metafile 102 may provide for the definition of graphical symbols used in system 100. By way of example, the format of the symbol metafile 102 may use a small subset of the Scaleable Vector Format (SVG) language and include various system specific extensions, for example, ARIS specific extensions to these standard elements. A symbol may be composed by graphic primitives called "elements." Each element may have its own set of attributes that define the visual and logical representation of the element. Each symbol may be defined through a combination of such elements. In accordance with an embodiment of the invention, the symbol format may define the following primitive graphic elements: rectangles, rounded rectangles, lines and polygons, ellipses and circles, and bitmaps (various graphic formats).

For purposes of illustration, the following table shows an exemplary XML markup for an AMF symbol (shown to the right of the XML-markup):

```
1  <?xml version='1.0' ?>
2  <svg amf:innerBoundingBox="22,20,174,96"
3       xmlns="http://www.w3.org/2000/svg" version="1.1"
4       xmlns:amf="http://www.ids-scheer.de/aris/amf/ns.htm"
5       xmlns:svg="http://www.w3.org/2000/svg"
6       xmlns:xlink="http://www.w3.org/1999/xlink">
7
8  <svg:rect
9       fill="#96ff96"
10      amf:fill-replaceable="1"
11      stroke="#000000"
12      stroke-width="1"
13      stroke-linecap="round"
14      amf:stroke-replaceable="1"
15      x="0" y="0"
16      width="249" height="155"
17      amf:rectRoundRadius="60"
18      amf:rectRoundingFixed="true"
19  />
20 <svg:polygon
21      fill="#ffff00"
22      amf:fill-replaceable="false"
23      stroke="#000000"
24      stroke-width="1"
25      amf:stroke-replaceable="false"
26      points="187,137 211,97 230,137 "
27      amf:fixedCorner="point(249,155)"
28 />
29 </svg>
```

As shown by the above example, the XML-markup for the symbol includes a header (lines 1-6) followed by the two elements constituting the symbol (i.e., a green-filed rectangle (lines 8-19) and a yellow-filled polygon (lines 20-28).

By way of further example, the following table summarizes AMF extensions that may be added to standard SVG elements to implement the components of FIG. 1 based on an ARIS system environment:

| Extension Attribute | Description | Valid Values | Default |
|---|---|---|---|
| stroke-replaceable | Configures the AMF renderer to use an user defined stroke when rendering the tagged graphic primitive object. The user defined stroke itself may override stroke color, stroke style, stroke strength, stroke dash-array etc. | 1) Numerical integer values with a value above 0. 2) Boolean value "true" or "false" Numerical values configure the renderer to use the external user defined stroke with the given number (if the renderer is configured with a set of user defined strokes) "false" configures the renderer to ignore any user defined strokes and only use the stroke that's defined inside the AMF file. "true" is a synonym for "1" and is only supported for backward compatibility. | "false" |
| fill-replaceable | Configures the AMF renderer to use the user defined brush of the given value when rendering the tagged graphic primitive object. The user defined brush itself describes a set of attributes that determines the for example fill color, fill style, fill transparency etc. | 1) Numerical integer with a value above 0. 2) Boolean value —"true" or "false" Numerical values configure the renderer to use the external user defined brush (the brush defines fill color, fill pattern, fill transparency) with the given number (if the renderer is configured with a set of user defined brushes) "false" configures the renderer to ignore any user defined brushes and only use the brush that's defined inside the AMF file. "true" is a synonym for "1" and is only supported for backward compatibility | "false" |
| fixedCorner | 1) Any attribute value other than "none" describes the surrounding graphical element as not scaleable. 2) The value of this attribute defines the | One value out of the following tree categories: 1) "point([x cord], [y cord])" that defines the coordinates of the anchor point. The coordinates are logical coordinates and therefore relative to the upper left | "none" (normal linear scaling) |

-continued

| Extension Attribute | Description | Valid Values | Default |
|---|---|---|---|
| | anchor point that is used by the renderer to position this non scaleable symbol. | corner of the symbol<br>2) A symbolic constant that represents a well known point inside the AMF. Valid constants are:<br>a. "lowerLeft"<br>b. "lowerRight"<br>c. "upperLeft"<br>d. "upperRight"<br>e. "center"<br>The constants "lowerLeft, lowerRight", "upperLeft" and "upperRight" represents the coordinates of the corresponding corners of the AMFs outer bounding box, the constant "center" represents the coordinates the center of the overall AMF has.<br>"none" —configures the render to scale the surrounding graphical element linear. (normal scaling) | |
| rectRoundRadius | This attribute is only valid for <svg:rect .. /> elements.<br>The standard SVG rect element describes a rectangular share of given with and height. However, is doesn't provide a mechanism to render rounded rectangles. This attribute configures the renderer to round every corner of the defining rectangle with an circle of the given radius | Numerical integer with a value equal to or above zero.<br>The value is interpreted as an circle radius. every corner of the rectangle is replaced with the corresponding quarter r of a circle with the given radius.<br>The radius is specified in logical coordinates. | 0 (normal rectangle, no rounded corners) |
| rectRoundingFixed | This attribute is only valid for <svg:rect .. /> elements that represents a rounded rectangle (that also have a valid "rectRoundRadius" attribute)<br>It defines if the rounding radius of rectangle should be increased if the rectangle is scaled to a width/height that is extending the default width. | 1) "true" The rounding radius of the tagged rectangles is fixed and will not scaled by the renderer even if the surrounding AMF is scaled.<br>2) "false" the rounding radius of the rectangle is scaled linearly according to the horizontal and vertical scale factors of the surrounding Symbol. | "true" |
| innerBoundingBox<[1–9]*> | Every AMF Symbol can have one or more explicit inner bounding boxes. This boxes are used by the renderer to determine the graphical boundaries of textual attributes that may be renderer inside the AMF Symbol.<br>One innerBoundingBox attributes defines one rectangle of these Rectangles.<br>The first inner rectangle is defined by the innerBoundingBox attribute, additional boxes can be defined by the innerBoundingBox[N] command. | Each inner bounding box is represented by the upper left corner oft the box and its horizontal and vertical extend.<br>innerBoundingBox = "22, 20, 174, 96" represents a box starting at the logical coordinates X = 22, Y = 20 that is 174 logical coordinates wide and has a height of 96 logical coordinates.<br>The logical coordinate (0/0) represents the top left corner from the outer bounding box. | If this attribute isn't set the renderer will calculate the inner box according to a predefined algorithm |

In addition to SVG or SVG with extensions, symbol metafile 102 may be based on other conventional and known vector graphics or metafile formats, such as cgm (computer graphics metafile), dpx (digital picture), igs (initial graphics), and swf (small web format).

Symbol editor 106, which may be implemented as a software component running on a computer or provided with the software components executed by client 112 (see below), may allow users to create symbols according to his or her own needs or other requirements. In one embodiment, symbol editor 106 enables user 110 to select and modify existing symbols in repository 114.

Changes to existing symbols may include, for example, the addition of company logos to a symbol or the changing colors or shades in a symbol. Additionally, as described above, it may be possible to reuse already existing graphics or symbols stored in external file format(s) 108. For example, symbol editor 106 may enable user 110 to import graphics stored in GIF, JPG, BMP and EMF (a Microsoft proprietary vector graphics file format) to create symbols that are defined via symbol metafile 102 and stored in repository 114 for use in system 100. In yet another embodiment, user 110 may create a completely new symbol using graphics tools and/or a library of primitives provided by symbol editor 106 to define the elements of the symbol. Once a new symbol is created, symbol editor 106 may save the new symbol to the repository 114.

In one embodiment, symbol editor 106 may comprise a general purpose computer (e.g., a personal computer, network computer, server, or mainframe computer) having a processor (not shown) that may be selectively activated or reconfigured by a computer program to perform one or more methods for allowing the user to create symbols or modify existing symbols, as described above. Alternatively, symbol editor 106 may be implemented with software that is executed by client 112.

As further shown in system 100, server 104 and client 112 may be connected to a network 130. Network 130 may facilitate the communication between these components, including the exchange of instructions, graphics and other data. Further, network 130 may support the operation between client 112 and server 104 according to a typical client-server relationship. One of skill in the art will appreciate that although one server and client are depicted in FIG. 1, any number of servers and clients may be provided. Furthermore, one of ordinary skill in the art will recognize that functions provided by one or more components of system 100 may be combined.

As indicated above, network 130 provides communications between the various entities in system 100, such as server 104 and client 112. Network 130 may be a shared, public, or private network and encompasses a wide area or local area. Further, network 130 may be implemented through any suitable combination of wired and/or wireless communication networks and may comprise a local area network (LAN), a wide area network (WAN), an intranet, or the Internet. Communication between server 104 and client 112 may be implemented using conventional protocols or technology, such as TCP/IP.

Server 104 may comprise a general purpose computer (e.g., a personal computer, network computer, server, or mainframe computer) having a processor (not shown) that may be selectively activated or reconfigured by a computer program to perform one or more methods consistent with the present invention. Server 104 may also be implemented in a distributed network. Alternatively, server 104 may be specially constructed for carrying-out methods consistent with the present invention. Furthermore, server 104 may include a repository 114 that comprises a database that stores data defining basic graphical primitives or elements of symbols used in system 100. Repository 114 may also comprises a database that stores data for defining default values for the external properties (fill color, line widths, shading, etc) of the symbols, as well as data reflecting customized symbols based on user-defined external properties. Consistent with an aspect of the invention, each such customized symbol may be stored as a different instance in the repository 114.

As disclosed herein, symbols stored in server 104 may be used by renderer 120 of client 112 to generate and render models. Each model may be defined by data that is stored in repository 114 of server 104. A toolset provided in renderer 120 or by other software (e.g., a model editor) may enable user 110 to create each model by, for example, selecting symbols and/or symbol instances to be included in the model, as well as defining the layout, arrangement and/or relationship between the various symbols in the model.

Consistent with embodiments of the invention, client 112 may be any type of device for communicating with server 104 over network 130. For example, client 112 may be a personal computer, handheld device, or any other appropriate computing platform or device capable of exchanging data with network 130. Client 112 may include one or more hardware and/or software components, such as renderer 120, data storage 140, and canvas 124. Further, program modules for implementing renderer 120 are discussed in further detail with respect to FIG. 2.

Figure 2:
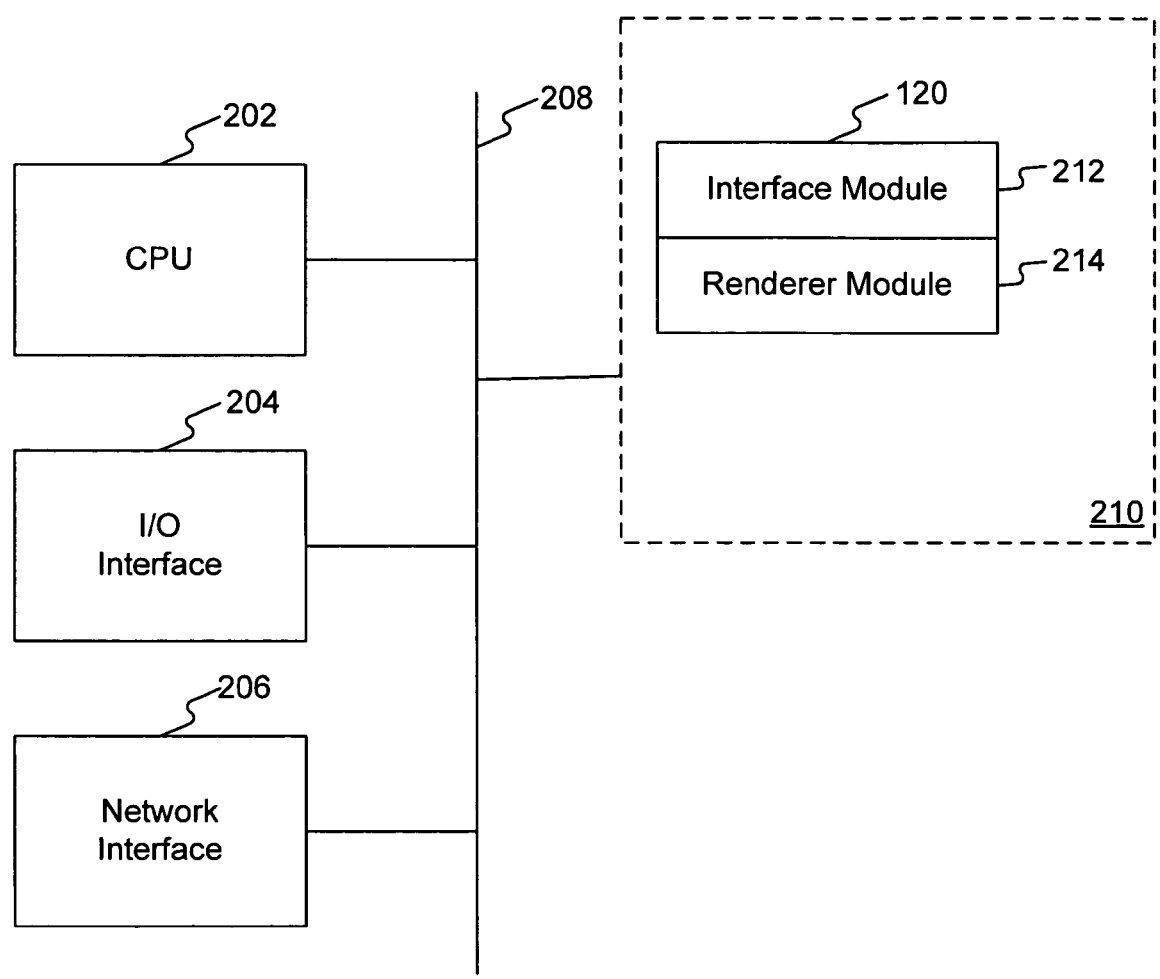
FIG. 2 illustrates an exemplary hardware and software architecture, consistent with an embodiment of the present invention.

FIG. 2 shows exemplary hardware and software architecture related to renderer 120, consistent with an embodiment of the present invention. The software components of FIG. 2 (interface module 212 and renderer module 214) may be packaged as part of the software systems or subsystems of renderer 120. The hardware devices of FIG. 2 (CPU 202, I/O interface 204, network interface 206, bus 208, memory 210) may be implemented as part of a computer or other hardware of client 112.

As shown in the example of FIG. 2, the hardware architecture may include at least one central processing unit (CPU) 202, an I/O interface 204, a network interface 206, and a memory 210. Memory 210 may be implemented as part of data storage 140 or otherwise provided separately as part of client 112. CPU 202 may execute instructions associated with the software processes contained in memory 210 and transmit results to other subsystems of renderer 120 or client 112 over a high speed interconnect or data bus 208. I/O interface 204 is an interface that may be used to couple renderer 120 to devices such as a keyboard, a mouse, a display device, and any other I/O device useful to user 110 in operating and managing renderer 120, as will be appreciated by one skilled in the art. Further, network interface 206 may be used to communicate with network 130 (FIG. 1).

To render symbols on canvas 124, memory 210 may store executable or programmed instructions in the form of one or more software modules 212 and 214. Software modules 212 and 214 may be written using any known programming language. As shown in FIG. 2, memory 210 includes an interface module 212 and a renderer module 214.

Interface module 212 may comprise programmed instructions for causing the display of repositories of symbols on canvas 124 for use in, for example, an editing or modeling tool. Renderer module 214 may have program instructions that, when executed, render symbols according to the user-specified criteria, as will be described further below. Renderer module 214 may use data from symbol metafile 102 and stored in repository 114 render a symbol on canvas 124. Additionally, or alternatively, render module 214 may use x and y coordinates defined by a user that specify where to draw a symbol on canvas 124, and/or sx and sy scaling factors defined by a user that specify whether a symbol is drawn stretched or shrunken in the x and y direction. Moreover, renderer module 214 may also exclude from scaling any elements specified by a user when rendering a symbol.

Figure 3A:
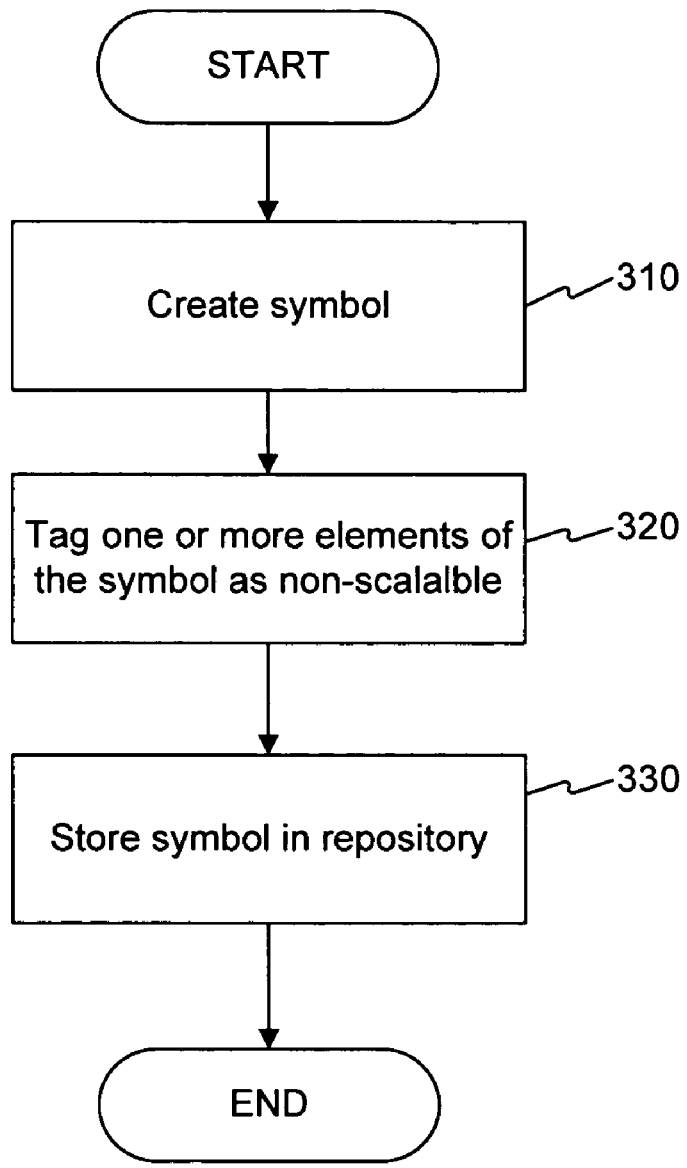
FIG. 3A is a flow diagram of an exemplary method for creating a symbol with non-scalable features, consistent with an embodiment of the present invention.

Referring now to FIG. 3A, a flow diagram is provided of an exemplary method for creating a symbol with non-scalable features. In order to create a symbol with non-scalable features, a user may first use symbol editor 106 to create a symbol (step 310). Symbol editor 106 may allow users to create symbols for non-linear scaling according to his or her own needs or other requirements. To create a new symbol, symbol editor 106 may enable user 100 to select, for example, an existing symbol from repository 114. in particular, symbol editor 106 may allow user 110 to select and modify existing symbols in symbol repository 114. Additionally, symbol editor may allow user 110 to combine a symbol from symbol repository 114 with one or more other symbols or graphics to provide a selected symbol for non-linear scaling, and/or import one or more graphics in external file format(s) 108 to provide the selected symbol for non-linear scaling.

After creating the symbol (step 310), user 110 may tag one or more elements of the symbol as being non-scalable (step 320). Elements of a symbol that may be identified as non-scalable may be an primitive graphic element, such as rectangles, rounded rectangles, lines and polygons, ellipses and circles, and bitmaps (various graphic formats). Further, the tag for an element may be represented through extension data of symbol metafile 102. For example, in the case of a rounded rectangle, the user 110 may specify the extension attribute "rectRoundRadius" as being non-scalable (see the above table of SVG extensions). Once defined, symbol editor 106 may cause the complete symbol metafile 102 for the symbol to be stored to a repository, such as repository 114 (step 330).

In one embodiment, the identification and tagging of elements of symbol may be achieved by one or more graphical user interfaces (GUIs) generated by symbol editor 106. For example, user 110 may be presented with one or more GUIs that include tools, function buttons, drop-down windows, etc. for selecting and tagging elements of a symbol for non-linear scaling. An element of the symbol may be tagged as being non-scalable when the user creates the symbol using symbol editor 106 or when the user modifies an existing symbol using symbol editor 106. As further described below, renderer 120 may render such symbols on canvas 124 using non-linear scaling techniques. For instance, if an element of the symbol to be rendered has been tagged earlier by the user 110 as being non-scalable, then this element is not scaled according to the scaling factor.

Figure 3B:
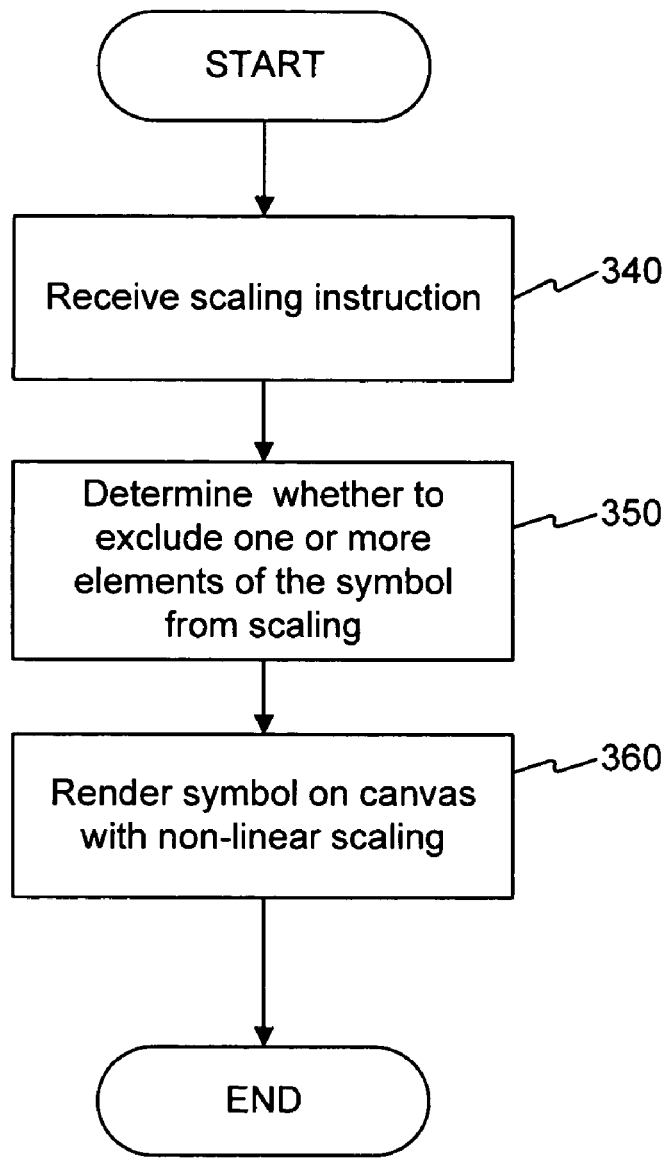
FIG. 3B is a flow diagram of an exemplary method for rendering a symbol with non-linear scaling, consistent with an embodiment of the present invention.

Referring now to FIG. 3B, a flow diagram is provided of an exemplary method for rendering symbols, consistent with an embodiment of the invention. As described below, the exemplary method of FIG. 3B may be implemented for rendering symbols with non-linear scaling, wherein the symbol to be rendered includes one or more elements that are tagged as being non-scalable.

At the start of the process, renderer 120 may first receive a scaling instruction from user 110 to scale a symbol (step 340). The scaling instruction may include a scaling factor specified by user 110. For example, a user may specify to scale a symbol to twice the size of the original symbol as stored in repository 114. Following the receipt of the scaling instruction, renderer 120 may determine whether to exclude one or more elements of the symbol from scaling and, in particular, the scaling factor to be applied to the symbol (step 350). This step may include analyzing the symbol metafile data in repository 114 to determine if one or more of the elements of the symbols are tagged as being fixed and, thus, non-scalable.

However, if the user specifies a scaling factor of less than "1," then even if the element is excluded from scaling by the user, and that element will still be scaled according to the scaling factor. Renderer 120 may determine whether to exclude one or more elements from the scaling factor based on whether an element has been tagged as being non-scalable. Based on this determination, renderer 120 may render the symbol with non-linear scaling on canvas 124, such that elements determined to be tagged as non-scalable are kept fixed while other elements of the symbol are scaled according to the scaling factor.

In one embodiment, if the scaling factor is less than 1, then even if the element is excluded from scaling by the user, and that element will still be scaled according to the scaling factor. In one embodiment, if the scaling factor consists of an x-scaling factor and a y-scaling factor and the two are different, then the lesser of the two is used in scaling the entire symbol.

Figure 4A:
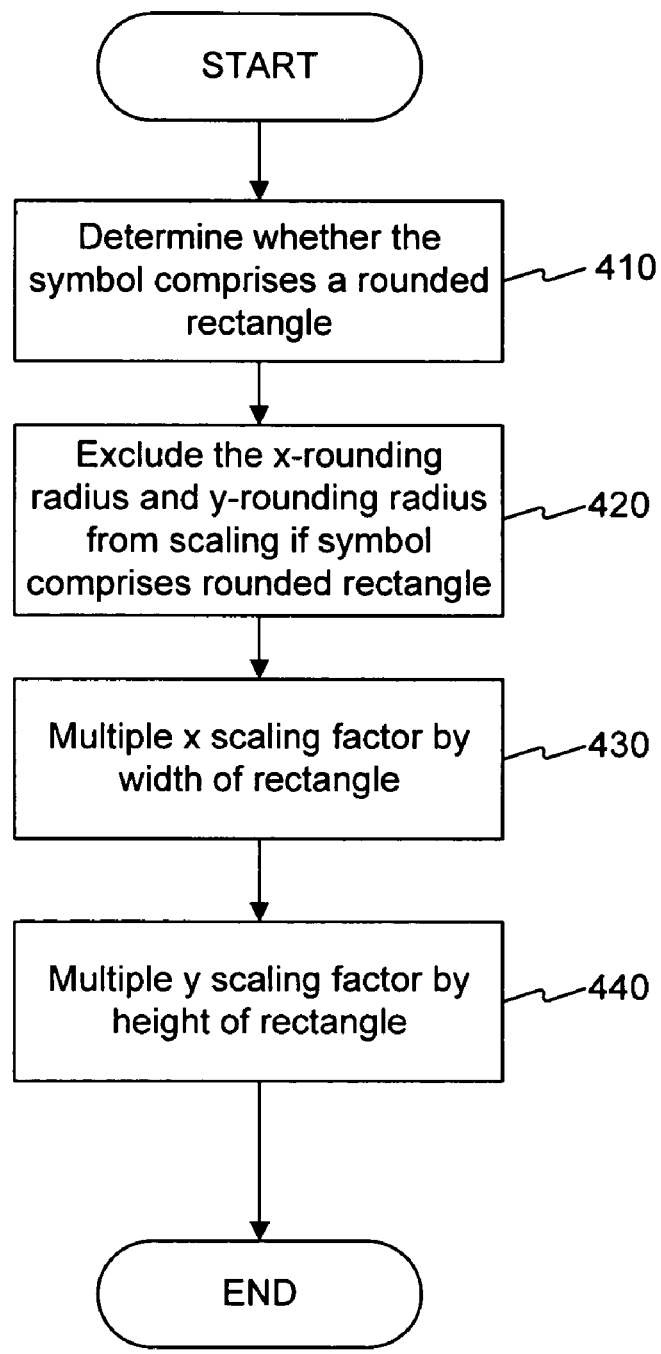
FIG. 4A is another flow diagram of an exemplary method for rendering a symbol, consistent with an embodiment of the present invention.

For purposes of providing further illustration of rendering techniques consistent with the present invention, FIG. 4A is a flow diagram of an exemplary method for rendering a rounded rectangle of a symbol. As shown in FIG. 4A, renderer 120 may first determine whether a symbol chosen by the user to be rendered comprises a rounded rectangle (step 410). All rectangles may have attributes such as brush color, pen width, x and y coordinate of where to render the rectangle, as well as width and height of the rectangle. A rounded rectangle also has two attributes describing the rounding of the corners or, more specifically, the x-rounding radius and y -rounding radius. The rounding radius is an arc. Therefore the y-rounding radius is the height of the arc and the x-rounding radius is the width of the arc. As used herein, the term "rounded rectangle" refers to a rectangle with rounded corners as opposed to perpendicular corners. If the user tags the corners of the rectangle as having fixed corners, the corners of the rounded rectangle are rendered by symbol renderer 120 with the same (i.e., fixed) corners, and these corners are excluded from any scaling factors applied to the rest of the rectangle. Other embodiments are also possible. For example, in one embodiment, when an x or y scaling factor is less than "1," the corners of the rectangle are scaled proportionally. Therefore, the corners are not excluded from scaling and the x-rounding radius and the y-rounding radius are also multiplied by the x and y scale factor to render the new rectangle. This approach may prevent an undesired distortion of the symbol, such as at the corners, when scaling to a smaller size than the original size.

Figure 4B:
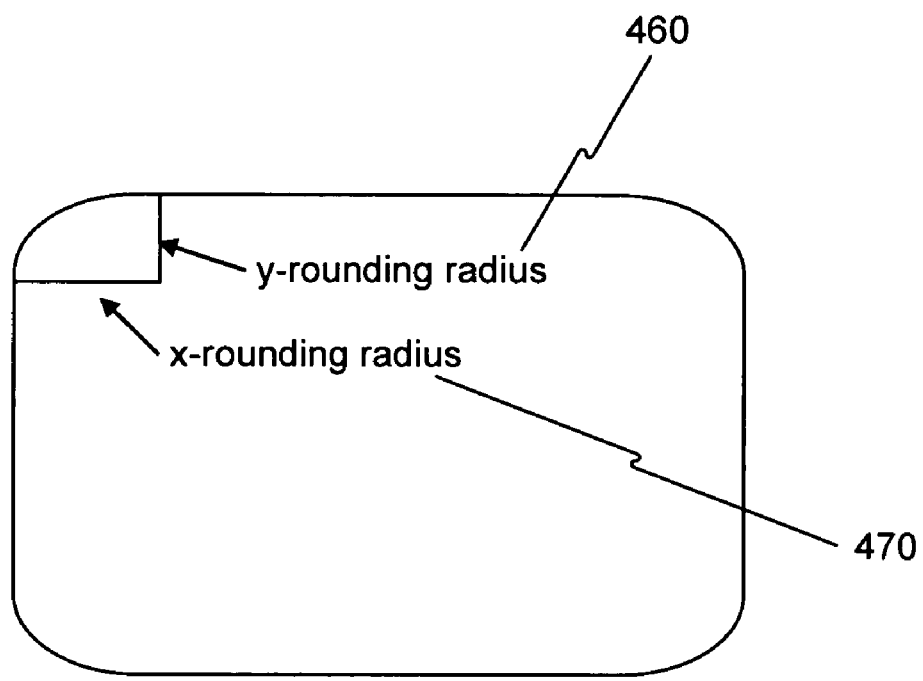
FIG. 4B is an exemplary rectangle, consistent with an embodiment of the present invention.

If the symbol comprises a rounded rectangle, then the symbol metafile data for the rectangle contains an x-rounding radius and a y-rounding radius as part of the elements of the rectangle. For purposes of illustration, FIG. 4B shows an x-rounding radius 470 and a y-rounding radius 460 for an exemplary symbol including a rounded rectangle. Referring again to FIG. 4A, if the symbol is determined to comprise a rounded rectangle, then renderer 120 excludes the x- and y-rounding radius from being modified by any scaling factors (step 420). Upon execution, when renderer 120 renders a symbol with a rounded rectangle that has been saved as having fixed corners, it may create a new, non-linearly scaled rounded rectangle R' by inheriting all of the attributes from the rectangle saved in repository 114. If a x scale factor ($s_x$) and y scale factor ($s_y$) are specified for rendering the rectangle, then renderer 120 may multiply the width of the rectangle symbol the by x scale factor (step 430) and the length of the rectangle by the y-scale factor (step 440) to provide the new, non-linearly scaled rectangle R'. As described above, the x-rounding radius and y-rounding radius may only be multiplied by the $s_x$ and $s_y$ scaling factor, if the $s_x$ and $s_y$ scaling factor are each less than 1. Upon instruction from the user, the symbol may be saved to repository 114 of server 104. Thereafter, the symbol can be used later when designing a model.

Figure 5A:
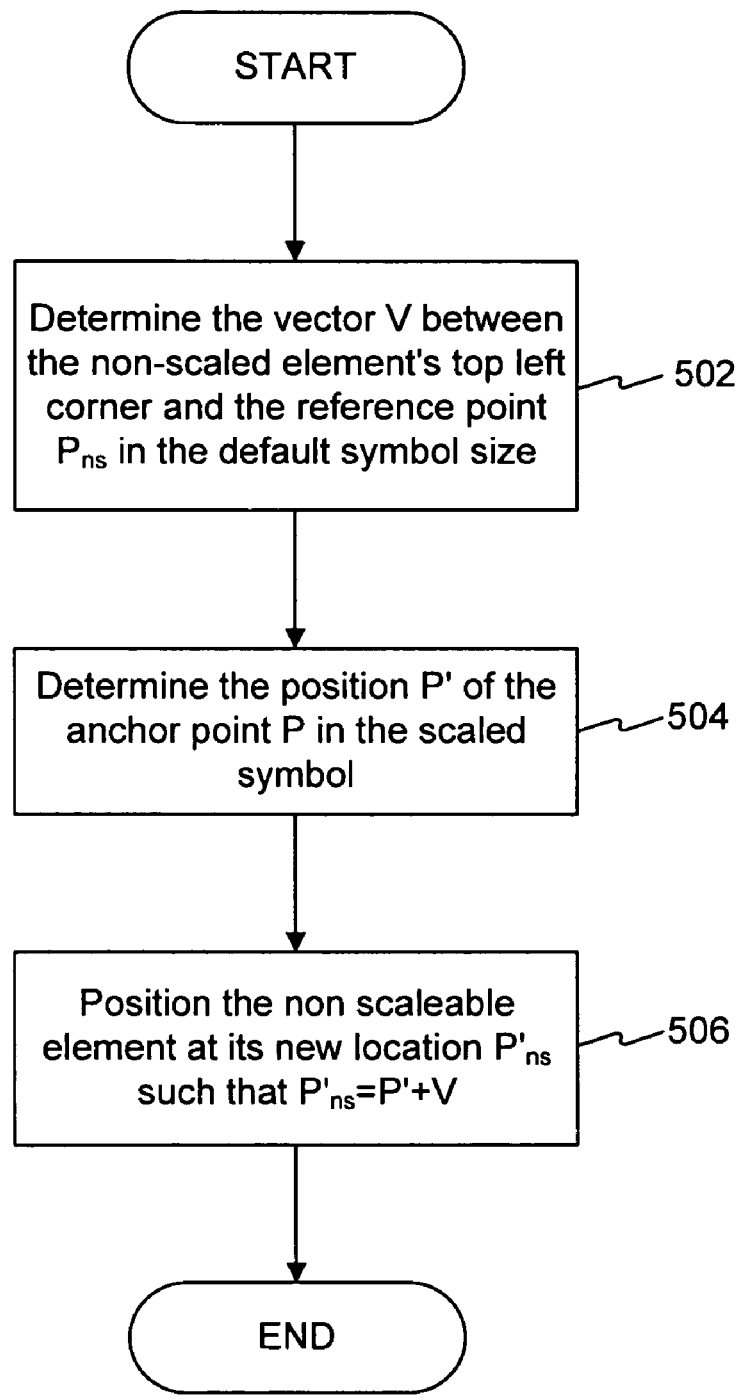
FIG. 5A is another flow diagram of an exemplary method for rendering a symbol, consistent with an embodiment of the present invention.

FIG. 5A is a flow diagram of another exemplary method for rendering a symbol with non-linear scaling, consistent with an embodiment of the present invention. The exemplary method of FIG. 5A provides a process for non-linear scaling with at least one anchor point and will be discussed with reference to FIG. 5B. Consistent with an aspect of the invention, an anchor-point may be defined by a user in connection with each non-scalable element of a symbol. The use of anchor points and the exemplary method of FIG. 5A may be useful once, for example, a symbol is tagged as having one or more non-scalable elements and renderer 120 needs to determine where to position those non-scalable elements on the canvas 124 upon rendering the symbol.

As shown in FIG. 5A, renderer 120 may first determine a vector (V) between the non-scaled element's top left corner $P_{ns}$ and the defined anchor point P in the default symbol size (step 502). For purposes of illustration, a non-scalable element is provided in FIG. 5B in the form of element 550, which is defined with an anchor point P 552. The vector (V) 554 is the distance between the non-scalable element $P_{ns}$ 550 and the anchor point P 522. Consistent with an aspect of the invention, the anchor point determines the point of reference to use for the non-scalable element, and may be moved across the canvas, as will be described further below.

Figure 5B:
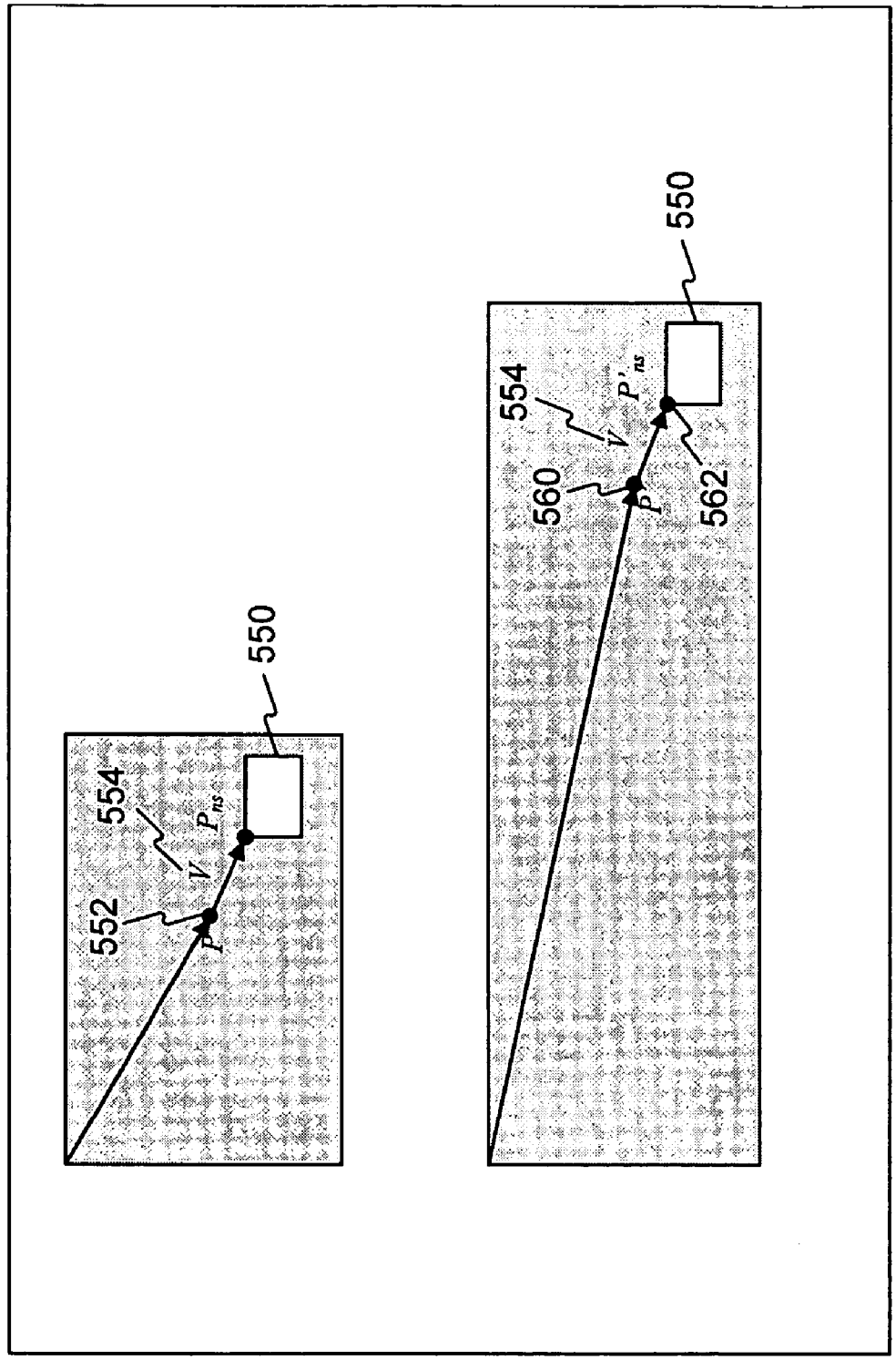
FIG. 5B is an exemplary transformation of a symbol, consistent with an embodiment of the present invention.

Referring again to FIG. 5A, renderer 120 may then determine the position P' of the anchor point P in the scaled symbol by multiplying the anchor point P's x coordinate by an $s_x$ scaling factor to get the x coordinate of P' and by multiplying the anchor point P's y coordinate by an $s_y$ scaling factor to get the y coordinate of P' 560 (P'=$P_x \times s_x, P_y \times s_y$) (step 504). Renderer 120 may then position the non-scaleable element 550 at its new location $P'_{ns}$ 562 (see FIG. 5B), such that the coordinate of the non-scalable element 550 is P' 560 plus the length of the vector V 554 (step 506). Therefore $P'_{ns}$=P'+V. In the example of FIG. 5B, the width of the symbol is approximately doubled without any adjustment to the height of the symbol (i.e., $s_x$=2. $s_y$=1).

Figure 5C:
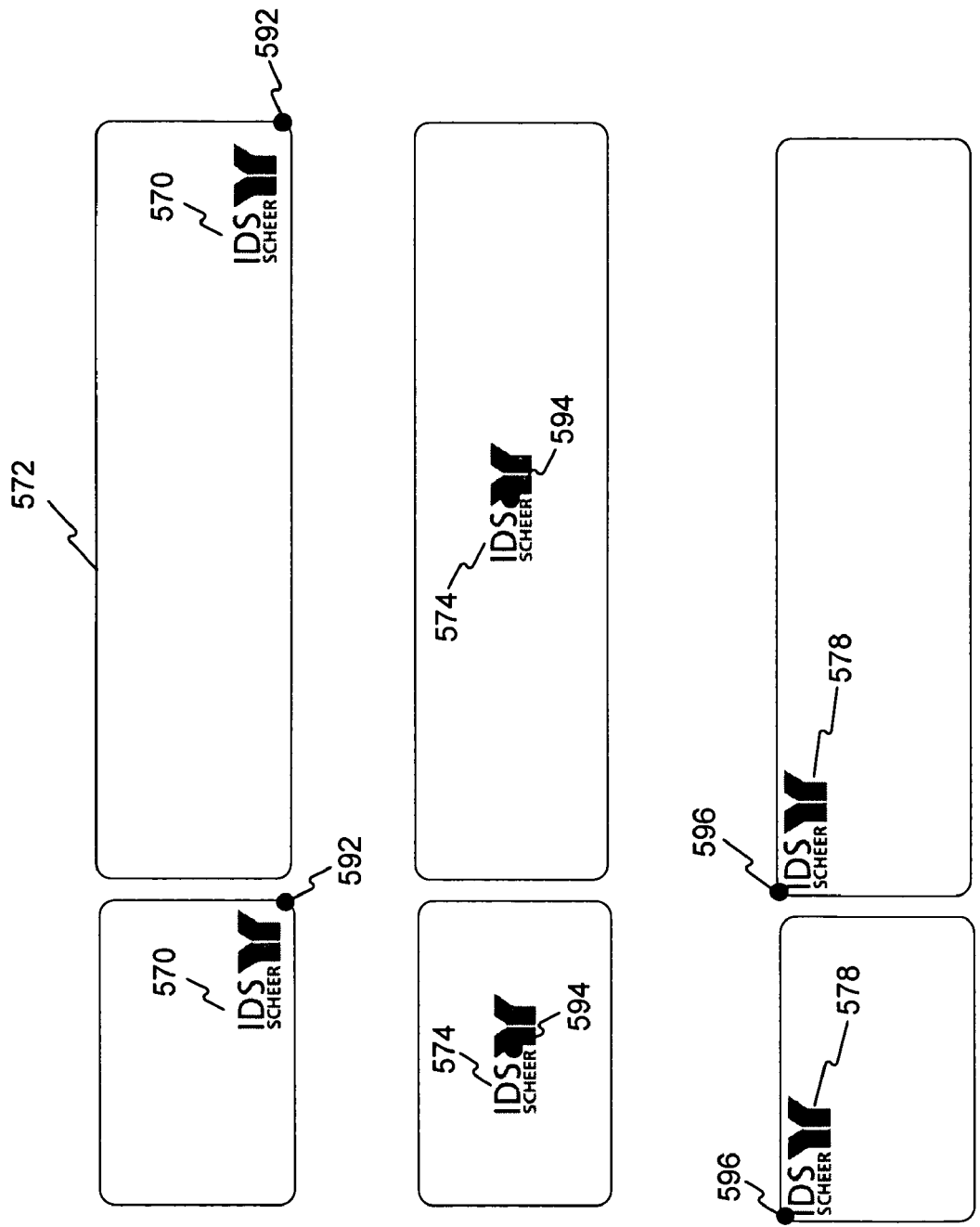
FIG. 5C is another exemplary transformation of a symbol, consistent with an embodiment of the present invention.

FIG. 5C is another exemplary transformation of a symbol, consistent with an embodiment of the present invention. Depending on how the anchor point of the non-scalable symbol is defined, the relative position of the non-scaled elements in the overall symbol for each scaling factor can be determined. For example, if the logo 570 is to appear at the bottom right side of the symbol after the symbol has been resized, then the user may choose to put the anchor point 592 in the bottom right corner of the symbol. Alternatively, if the logo 574 is to appear in the center of the symbol after resize, then the user may put the anchor point 594 in the center of the symbol. As yet another alternative, if the logo 578 is to appear in the top left corner, the user may put the anchor point 596 in the top left corner of the symbol.

Figure 6A:
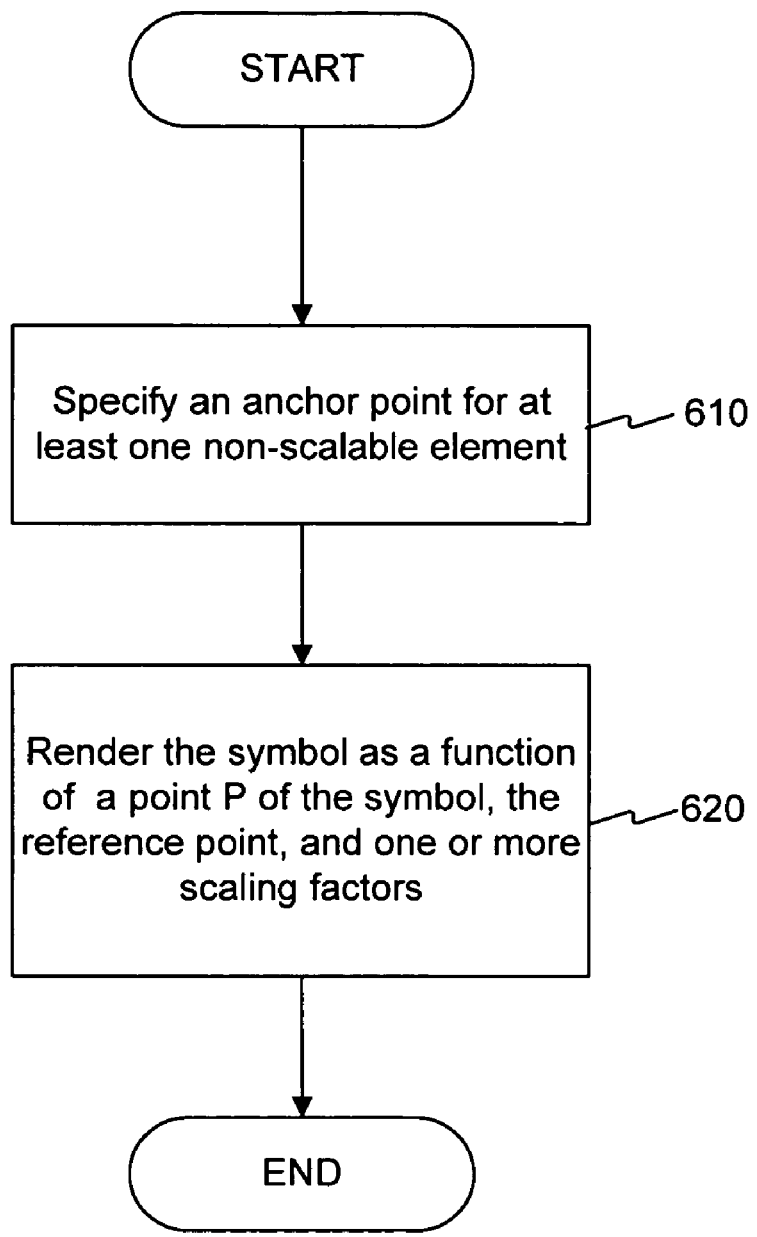
FIG. 6A is another flow diagram of an exemplary method for rendering a symbol, consistent with an embodiment of the present invention.

FIG. 6A is a flow diagram of an exemplary method for rendering a symbol with non-linear scaling, consistent with an embodiment of the present invention. The exemplary method of FIG. 6A is described with reference to FIG. 6B-6C.

After the user has tagged one or more elements as being non-scalable elements, the user may select a anchor point R for each non-scalable element on canvas 124. The anchor point R may be any point on canvas 124 and arbitrarily assigned by the user for each non-scalable element using, for example, a symbol editor or rendering tool. As described above, each anchor point is used to render the non-scalable element. Renderer 120 may determine P' as the result of a function $f$, which has as input the point P to be transformed, the anchor point(s) R and the scaling factors $s_x$ and $s_y$ (step 620). The user may transform the image by either keeping the distance of a point constant with respect to a certain anchor point (see, e.g., FIG. 6B) or by always keeping an angle constant when scaling an object (see, e.g., FIG. 6C).

Figure 6B:
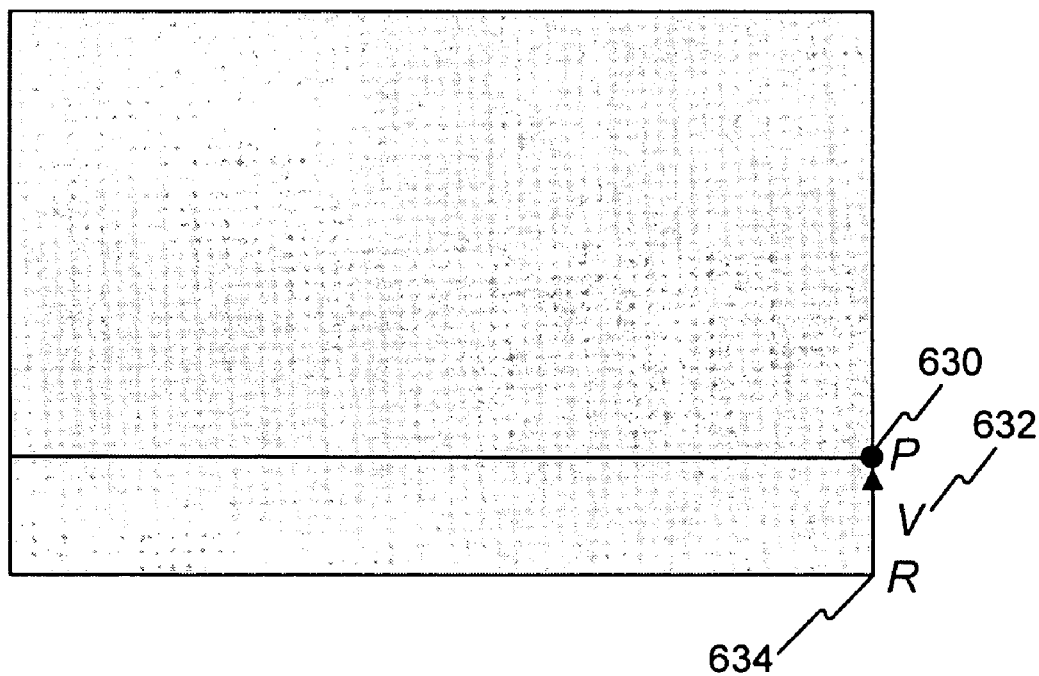
FIG. 6B is another exemplary transformation of a symbol, consistent with an embodiment of the present invention.

As shown in FIG. 6B, if the user decides to perform a constant distance transformation, then the new scaled position P' of P 630 can be computed by rendered 120 by first transforming the anchor point R 634 linearly and then adding V 632 (the distance between P and R) without applying any transformation to V. In one embodiment, the following formula may be used for non-linear transformation: $P'_x = R_x \times s_x + V_x$ and $P'_y = R_y \times s_y + V_y$.

Figure 6C:
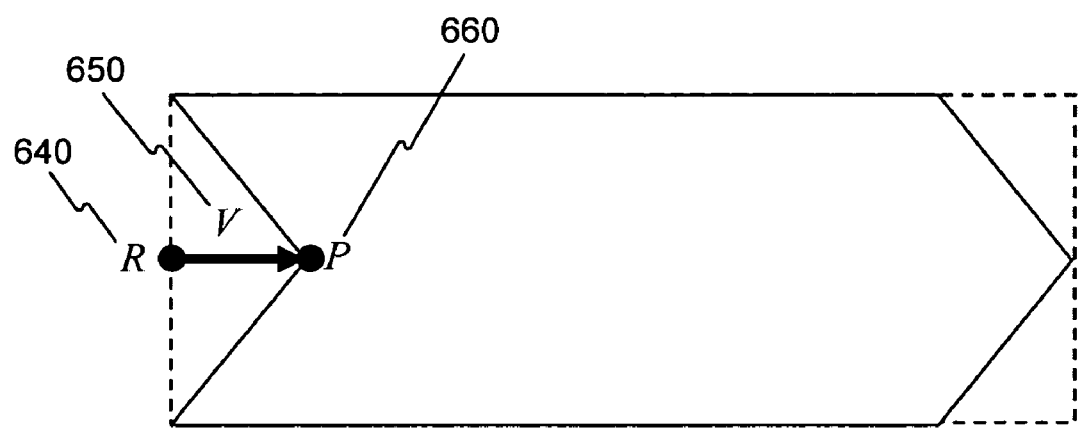
FIG. 6C is another exemplary transformation of a symbol, consistent with an embodiment of the present invention.

Referring to FIG. 6C, if the user decides to perform a constant angle transformation, then renderer 120 may determine the new scaled position P's of point P 660 by first transforming the anchor point R 640 linearly and then scaling V 650 before adding it to the anchor point R 640. In one embodiment, renderer 120 may use the following formulas for the constant angle transformation: $P'_x = R_x \times s_x + V_x \times s_y$ and $P'_y = R_y \times s_y + V_y \times s_x$.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in may other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with embodiments of the present invention also include computer readable media that include program instruction or code for performing various computer-implemented operations based on the methods and processes disclosed herein. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of rendering a symbol with non-linear scaling, the symbol comprising one or more elements, comprising:
receiving a scaling instruction to scale the symbol, the scaling instruction including at least one scaling factor;
determining, using a processor, whether to exclude one or more elements of the symbol from the scaling factor to be applied to the symbol, wherein a determination to exclude one or more elements is based on whether an element is tagged as being non-scalable by a user through a graphical user interface; and
rendering the symbol on a canvas with non-linear scaling, such that the elements of the symbol that are determined to be tagged are not scaled according to the at least one scaling factor, wherein rendering comprises:
specifying an anchor point for an element that is tagged as being non-scalable, wherein the anchor point determines a point of reference for the non-scalable element; and
rendering the symbol as a function of a point P of the symbol, wherein P is the point to be transformed, the anchor point, and one or more scaling factors.

2. The method of claim 1, further comprising:
applying an x-scaling factor and a y-scaling factor to each element that is determined not to be tagged as a non-scalable element.

3. The method of claim 1, further comprising:
determining whether the symbol includes a rounded rectangle; and
scaling, based on the determination that the symbol includes a rounded rectangle, the symbol according to an x-scaling factor and y-scaling factor, wherein scaling comprises:
excluding an x rounding radius and a y rounding radius from the scaling factor; and
multiplying the width of the rectangle by a x scaling factor and a length of the rectangle by a y scaling factor.

4. The method of claim 2, further comprising:
determining where to position each element that is non-scalable.

5. The method of claim 1, further comprising:
transforming the anchor point linearly; and
adding V, wherein V is the length of a vector measures the distance between the point P and the anchor point.

6. The method of claim 1, further comprising:
transforming the anchor point linearly; and
scaling V before adding it to the anchor point.

7. The method of claim 1, wherein if the at least one scaling factor is less than 1, then the element that is tagged as being non-scalable is scaled according to the scaling factor.

8. A system of rendering a symbol with non-linear scaling, the symbol comprising one or more elements, the system comprising:
a processor; and
a memory comprises instructions that are adapted to cause the processor to perform a method comprising:
receiving a scaling instruction to scale the symbol, the scaling instruction including at least one scaling factor;
determining whether to exclude one or more elements of the symbol from the scaling factor to be applied to the symbol, wherein a determination to exclude one or more elements is based on whether an element is tagged as being non-scalable by a user through a graphical user interface; and
rendering the symbol on a canvas with non-linear scaling, such that the elements of the symbol that are determined to be tagged are not scaled according to the at least one scaling factor, wherein rendering comprises:
specifying an anchor point for an element that is tagged as being non-scalable, wherein the anchor point determines a point of reference for the non-scalable element; and
rendering the symbol as a function of a point P of the symbol, wherein P is the point to be transformed, the anchor point, and one or more scaling factors.

9. The system of claim 8, further comprising:
applying an x-scaling factor and a y-scaling factor to each element that is determined not to be tagged as a non-scalable element.

10. The system of claim 8, further comprising:
determining whether the symbol includes a rounded rectangle; and
scaling, based on the determination that the symbol includes a rounded rectangle, the symbol according to an x scaling factor and a y scaling factor, wherein scaling comprises:
excluding an x rounding radius and a y rounding radius from the scaling factor; and
multiplying the width of the rectangle by the x scaling factor and a length of the rectangle by the y scaling factor.

11. The system of claim 9, further comprising:
determining where to position each element that is non-scalable.

12. The system of claim 8, further comprising:
transforming the anchor point linearly; and
adding V, wherein V is the length of a vector measures the distance between the point P and the anchor point.

13. The system of claim 8, further comprising:
transforming the anchor point linearly; and
scaling V before adding it to the anchor point.

14. The system of claim 8, wherein if the at least one scaling factor is less than 1, then the element that is tagged as being non-scalable is scaled according to the scaling factor.

15. A non-transitory computer-readable medium storing programmable instructions adapted to perform a method rendering a symbol with non-linear scaling, the method comprising steps of:
receiving a scaling instruction to scale the symbol, the scaling instruction including at least one scaling factor;
determining, using a processor, whether to exclude one or more elements of the symbol from the scaling factor to be applied to the symbol, wherein a determination to exclude one or more elements is based on whether an element is tagged as being non-scalable by a user through a graphical user interface; and
rendering the symbol on a canvas with non-linear scaling, such that the elements of the symbol that are determined to be tagged are not scaled according to the scaling factor, wherein rendering comprises:
specifying an anchor point for an element that is tagged as being non-scalable, wherein the anchor point determines a point of reference for the non-scalable element; and rendering the symbol as a function of a point P of the symbol, wherein P is the point to be transformed, the anchor point, and one or more scaling factors.

16. The non-transitory computer-readable medium of claim 15, the steps further comprising:
applying an x scaling factor and a y scaling factor to each element that is determined not to be tagged as a non-scalable element.

17. The non-transitory computer-readable medium of claim 15, the steps further comprising:
determining whether the symbol is a rectangle;
tagging an x-rounding radius and y-rounding radius of the rectangle as non-scalable based on the determining; and
multiplying the x scaling factor by a width of the rectangle and the y scaling factor by a length of the rectangle.

* * * * *